United States Patent
Rosenblit et al.

(10) Patent No.: US 7,466,889 B1
(45) Date of Patent: Dec. 16, 2008

(54) HIGH-QUALITY-FACTOR TUNABLE MICRODISK

(75) Inventors: Michael Rosenblit, Ashdod (IL); Ron Folman, Rehovot (IL)

(73) Assignee: Ben Gurion University of the Neger Research and Development Authority, Beer Sheva (IL)

( * ) Notice: Subject to any disclaimer, the term of this patent is extended or adjusted under 35 U.S.C. 154(b) by 197 days.

(21) Appl. No.: 11/572,633

(22) PCT Filed: Feb. 2, 2006

(86) PCT No.: PCT/IL2005/000786

§ 371 (c)(1),
(2), (4) Date: Jan. 25, 2007

(87) PCT Pub. No.: WO2006/011138

PCT Pub. Date: Feb. 2, 2006

Related U.S. Application Data

(60) Provisional application No. 60/590,930, filed on Jul. 26, 2004.

(51) Int. Cl.
*G02B 6/10* (2006.01)
*G02B 6/12* (2006.01)

(52) U.S. Cl. ............ 385/129; 385/14; 385/27; 385/28; 385/31; 385/130; 385/131; 385/132

(58) Field of Classification Search ............ 385/129
See application file for complete search history.

(56) References Cited

U.S. PATENT DOCUMENTS

| 6,633,696 | B1 * | 10/2003 | Vahala et al. ............ 385/27 |
| 6,920,253 | B2 * | 7/2005 | Tan et al. ............ 385/1 |
| 7,424,192 | B2 * | 9/2008 | Hochberg et al. ............ 385/122 |
| 2001/0004411 | A1 * | 6/2001 | Yariv ............ 385/28 |

* cited by examiner

*Primary Examiner*—Frank G Font
*Assistant Examiner*—Mary A El Shammaa
(74) *Attorney, Agent, or Firm*—Mark M. Friedman

(57) ABSTRACT

An optical device includes a waveguide and a microdisk that is optically coupled to the waveguide. The gap between the microdisk and the waveguide is between 0.3 microns and 0.7 microns. The diameter of the microdisk is between 15 microns and 50 microns. The quality factor of the microdisk is at least 105. The microdisk is tuned optoelectrically or piezoelectrically.

12 Claims, 5 Drawing Sheets

HIGH-QUALITY-FACTOR TUNABLE MICRODISK

FIELD AND BACKGROUND OF THE INVENTION

The present invention relates to microscale optical devices and, more particularly, to an optical device that includes a tunable microdisk resonator with a high quality factor.

High-quality-factor resonant optical devices such as Fabry-Perot cavities have been proposed as extremely effective tools for the delicate manipulation and measurement of subtle quantum states (P Horak et al., "Possibility of single-atom detection on a chip", *Phys. Rev. A* vol. 67 p. 43806 (2003); W. von Klitzing et al., "Tunable whispering gallery modes for spectroscopy and CQED experiments", *New J. Phys.* Vol. 3 p. 14 (2001)). If the quality factor of such a device is sufficiently high, a single photon can interact many times with the same atom, ion or molecule so that a significant interaction can be achieved. However, to achieve such strong coupling, the optical device must be kept on resonance with a frequency that is sufficiently close to the frequency of the chosen quantum transition.

Tunable resonant microdisks have been used as filters and switches in optical communication (Konstadin Djordjev et al., "Microdisk tunable resonant filters and switches", *IEEE Photonics Technology Letters* vol. 14 no. 6 pp. 828-830 (June 2002)).

A "microcavity" is, essentially, a microdisk turned inside-out. Integrated optical microcavities have been used in evanescent-wave spectroscopy (E. Krioukov et al., "Integrated optical microcavities for enhanced evanescent-wave spectroscopy". *Optics Letters* vol. 27 no. 17 pp. 1504-1506 (September 2002)).

SUMMARY OF THE INVENTION

According to the present invention there is provided an optical device including: (a) a waveguide; and (b) a microdisk, optically coupled to the waveguide, separated from the waveguide by a gap of between about 0.3 microns and about 0.7 microns and having a diameter of between about 15 microns and about 50 microns and a quality factor of at least about $10^5$.

The basic optical device of the present invention includes a waveguide and a microdisk that is optically coupled to the waveguide. The gap between the waveguide and the microdisk is between about 0.3 microns and about 0.7 microns. The diameter of the microdisk is between about 15 microns and about 50 microns, more preferably between about 15 microns and about 30 microns, most preferably between about 15 microns and about 20 microns. The quality factor of the microdisk is at least about $10^5$.

Preferably, the microdisk is substantially cylindrical. Alternatively, the microdisk is substantially toroidal, in which case the "diameter" of the microdisk is the outer diameter of the microdisk.

Preferably, the waveguide is tapered for mode matching with the microdisk.

Preferably, the waveguide and the microdisk are fabricated on a common substrate.

Preferably, the gap is at least about 0.5 microns and the quality factor is at least about $10^6$. Most preferably, the gap is about 0.7 microns and the quality factor is at least about $10^7$.

Preferably, the optical device also includes a mechanism, such as an optoelectric mechanism or a piezoelectric mechanism, for tuning the microdisk.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a resonant-microdisk-based optical device that can be used for single-quantum-particle detection.

The principles and operation of a resonant-microdisk-based optical device according to the present invention may be better understood with reference to the drawings and the accompanying description.

Figure 1:
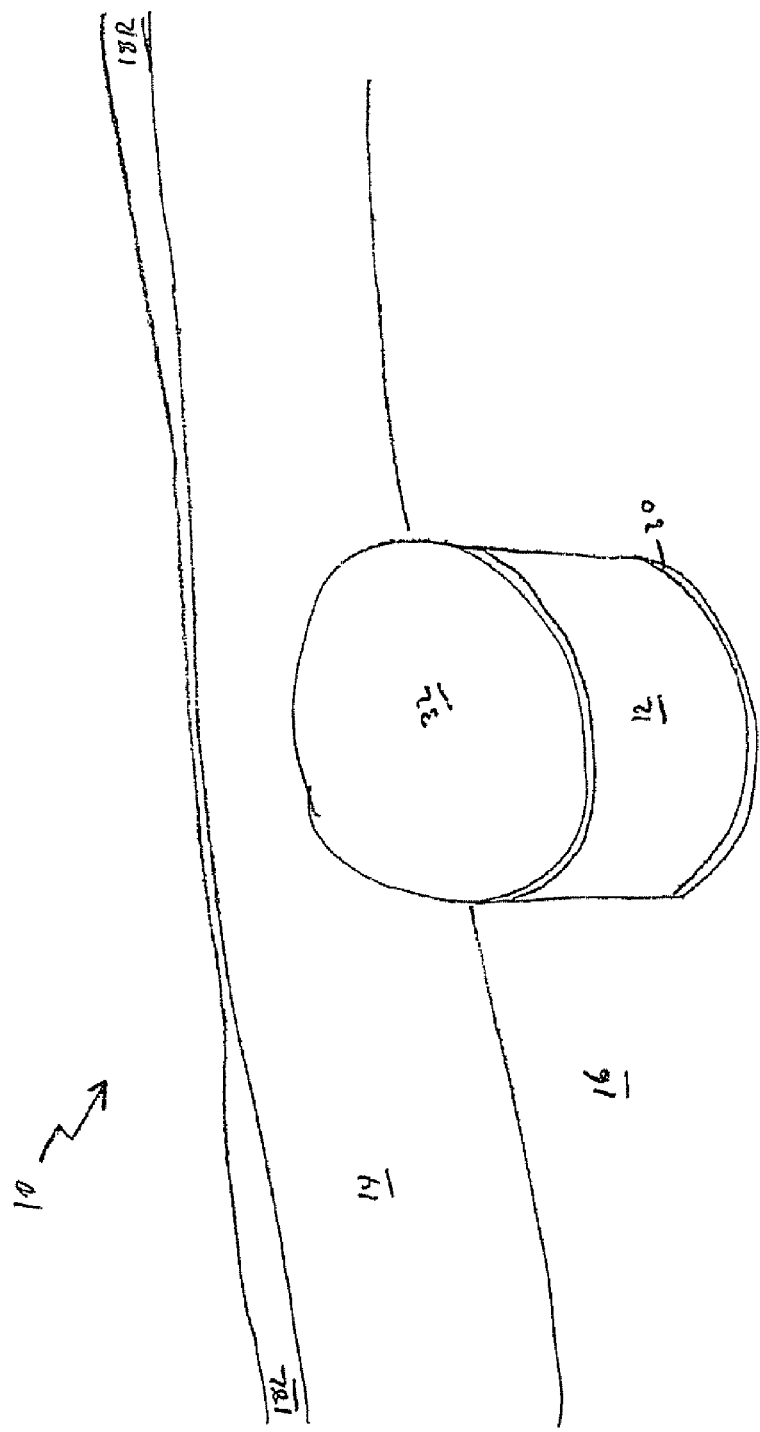
FIG. 1 is a schematic perspective view of a minimal optical device of the present invention.

Referring now to the drawings, FIG. 1 is a schematic perspective view of the minimal optical device 10 of the present invention. Device 10 includes a cylindrical microdisk 12 and a slab waveguide 14 fabricated on a common substrate 16. Minimal device 10 is an integrated part of a larger system that includes several optical, electronic and micromechanical devices all fabricated on a larger chip. Methods of fabricating such chips are known in the art (T. J. Kippenberg et al., "Fabrication and coupling to planar high-Q silica disk microcavities", *Appl. Phys. Lett.* Vol. 83 p. 797 (2003); D. K. Armani et al., "Ultra-high-Q toroid microcavity on a chip", *Nature* vol. 421 p. 925 (2003); V. Zwiller et al., "Fabrication and time-resolved studies of visible microdisk lasers", *J. Appl. Phys.* Vol. 93 p. 2307 (2003)) and so need not be recited herein.

Figure 2:
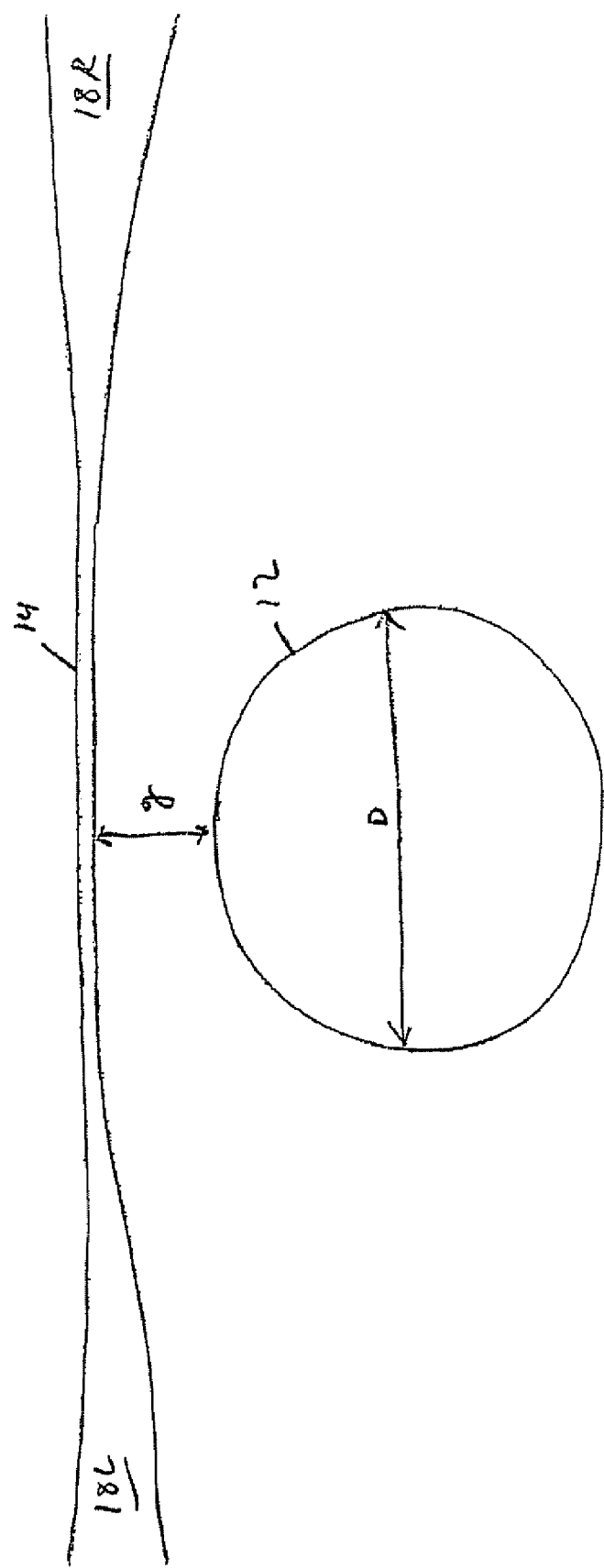
FIG. 2 is a plan view of the device of FIG. 1.

FIG. 2 is a plan view of device 10, showing the geometric parameters of device 10: the diameter D of microdisk 12 and the gap g between microdisk 12 and waveguide 14.

Waveguide 14 couples light into and out of microdisk 12. Adiabatically tapered ends 18L and 18R of waveguide 14 are attached to optical fibers (not shown). In order to optimize power transfer between waveguide 14 and a single-mode optical fiber, the mode overlap at the interface between waveguide 14 and the optical fiber must be maximized. For example, typical cross-sectional dimensions of waveguide 14 are 9×9 microns and 12×12 microns for the refractive index range of 1.454 to 2.17 and 14×14 microns for a refractive index of 3.5, for wavelengths around 780 nm. Coupling efficiencies of 96% to 98% can be achieved. For the best mode matching with whispering gallery modes (WGM) in microdisk 12, ends 18L and 18R need to taper inwards to a width of between 0.3 microns and 1.2 microns.

Microdisk 12 is shown as a right-circular cylinder. Alternatively, microdisk 12 is a cylindrical torus, that supports almost the same WGM as a cylinder.

The optical properties of device 10 were modeled using finite difference time domain (FDTD) (S. C. Hagness et al., "FDTD microcavity simulations: design and experimental realization of waveguide-coupled single-mode ring and whispering-gallery-mode disk resonators", *J. Lightwave Technol.* Vol. 15 p. 2154 (1997)) and coupled mode theory (CMT) (D. R. Rowland and J. D. Love., "Evanescent wave coupling of whispering gallery modes of a dielectric cylinder", *IEEE Proceedings-J* vol. 140 p. 177 (1993)) methods. In most cases, the wavelength of the light was 780 nm, which is of interest as the wavelength of an electronic transition of Rubidium.

Figure 3:
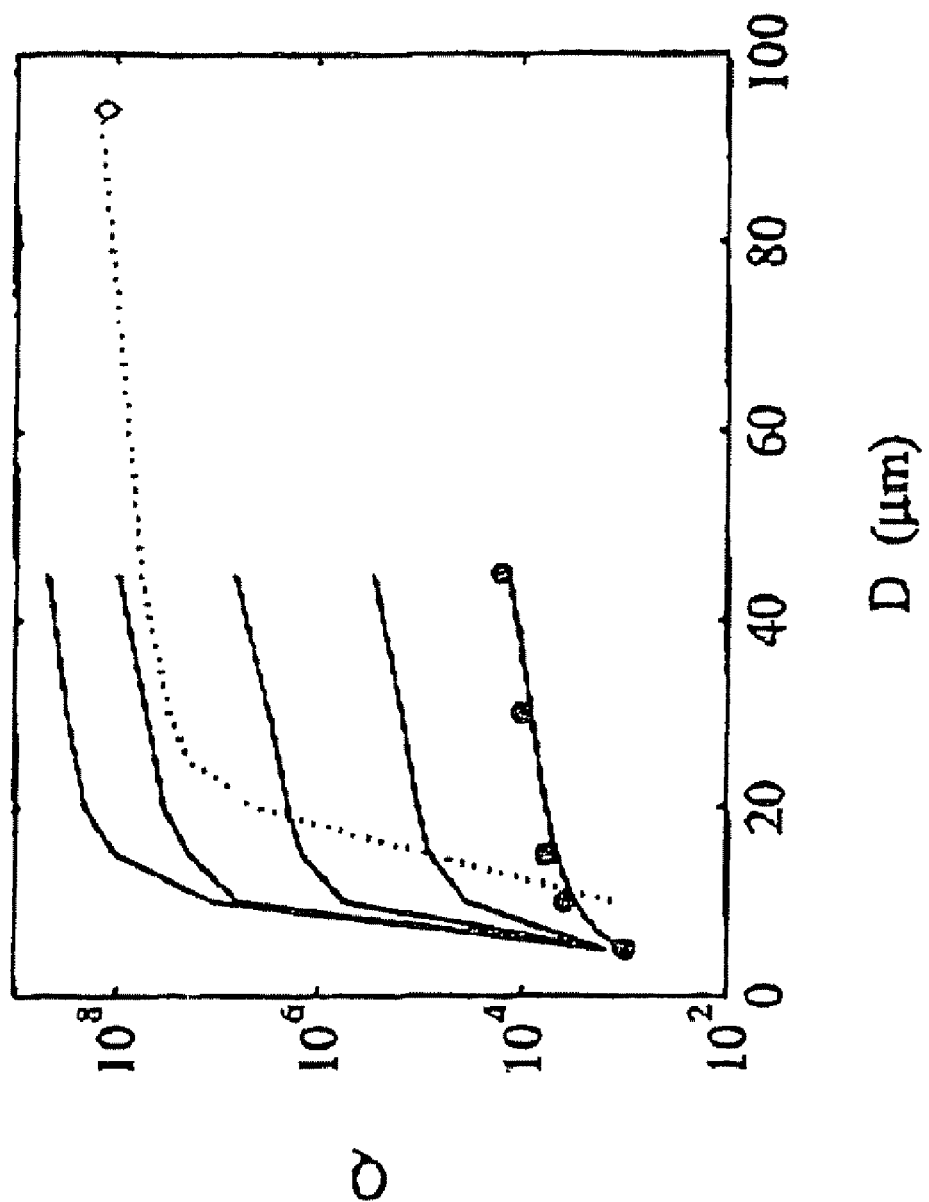
FIG. 3 shows plots of calculated Q vs. D for several values of g.

The objective of the modeling was to show the ability to obtain a high quality factor Q with relatively small disk sizes worthy of the name "microresonator". In FIG. 3, the solid lines are plots of Q as a function of D, obtained using CMT. Curves 20, 22, 24, 26 and 28 are, respectively, Q vs. D at gaps g of 0.1 microns, 0.3 microns, 0.5 microns, 0.7 microns and ∞ (i.e., microdisk 12 not coupled to waveguide 14), for a wavelength of 780 nm and an index of refraction of 1.454. The five solid dots were computed for g of 0.1 microns using FTDT, which is computationally much more expensive than CMT, to verify the accuracy of the CMT computations. The dotted line is a CMT computation for g about 0.9 microns, a wavelength of 1550 nm and an index of refraction of 1.444. The diamond is the corresponding measurement of Kippenberg et al.

To calculate Q for different values of D, the longitudinal index l of the WGM must be changed accordingly to keep the resonant wavelength near 780 nm. The wavelength needed for optimal mode resonance can be achieved by choosing a precise value of D. Different materials have been used in the prior art to fabricate microdisk resonators with refractive indices ranging from 1.444 up to 3.5. The values of 1.454 and 1.444 used in FIG. 3 corresponds to fused silica at the respective wavelengths. The following table shows some sample CMT results. q is the radial index of the WGM.

| D (microns) | l | q | Wavelength (nm) | Q (g = 0.3 microns) | Q (g = 0.6 microns) |
|---|---|---|---|---|---|
| 30 | 167 | 1 | 778.73 | $1.55 \times 10^5$ | $8.44 \times 10^6$ |
| 30 | 166 | 1 | 783.27 | $1.47 \times 10^5$ | $8.05 \times 10^6$ |
| 30 | 159 | 2 | 780.04 | $1.83 \times 10^5$ | $8.85 \times 10^6$ |
| 15 | 81 | 1 | 780.41 | $7.66 \times 10^4$ | $3.82 \times 10^6$ |
| 45 | 253 | 1 | 780.15 | $2.66 \times 10^5$ | $1.40 \times 10^7$ |

Figure 4:
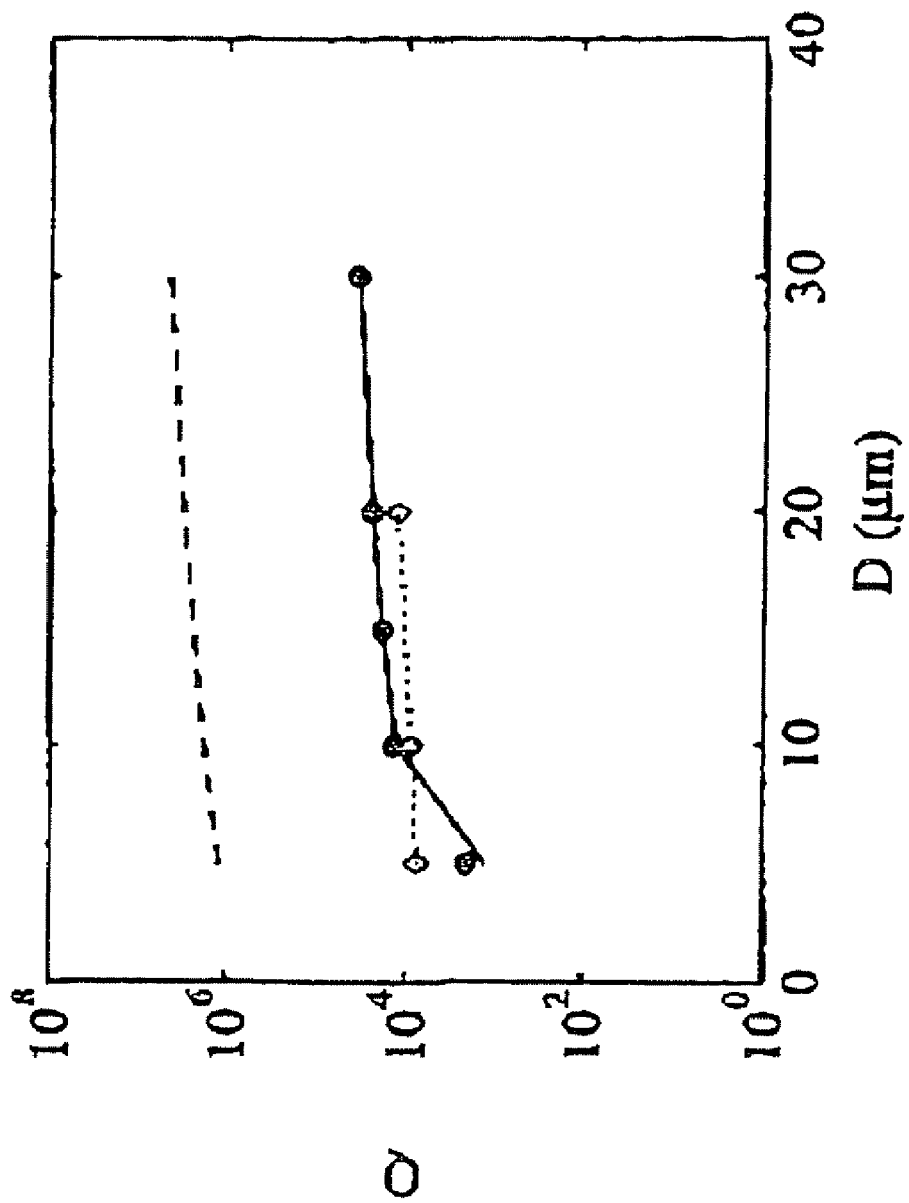
FIG. 4 shows plots of calculated Q vs. D for two indices of refraction and two wavelengths at g=0.2 microns.

Values of Q also were computed using CMT and FDTD for other materials, with other refractive indices, for example AlGaAs/GaAs and SiN, for which tuning mechanisms have been reported, at a gap g of 0.2 microns. Some of these results are plotted in FIG. 4. The dashed curve in FIG. 4 is for a wavelength of 780 nm and an index of refraction of 2.17, the index of refraction of $Si_3N_4$ at that wavelength. The solid curve in FIG. 4 is for a wavelength of 780 nm and an index of refraction of 1.454. As in FIG. 3, the solid dots represent FDTD results corresponding to the solid line. The dotted curve is for a wavelength of 1550 nm and an index of refraction of 3.2. The diamonds represent measurements by Hagness et al.

In general, the resonance width of a microdisk is orders of magnitude narrower than the microdisk's full spectral range (FSR). Therefore, coincidences between the transverse fundamental WGM of a microdisk and the frequency of a quantum transition of interest are extremely unlikely. To keep a WGM resonance near the wavelength of interest (note that wavelength and frequency are equivalent in this context) either the diameter of the microdisk or the refractive index of the microdisk must be changed. In other words, the microdisk must be tuned. The tuning procedure must be stable and reversible and the tuning range has to be of the same order of magnitude as the FSR. Under those conditions, a resonant mode close to the required quantum transition frequency always can be found, even if the microdisk was fabricated with a mismatch in diameter or in refractive index. The tuning procedure also must be fast enough to compensate for temporal instabilities such as those arising from temperature fluctuations of the chip.

Suitable tuning mechanisms include optoelectrical tuning and piezoelectrical tuning. Such tuning affects the mode resonance via $\Delta v/v = \Delta n/n = \Delta D/D$, where v is the resonance mode frequency and n is the index of refraction. To achieve full FSR tuning, $\Delta v/v$ must be approximately the reciprocal of the WGM longitudinal mode index l. Actually, because radial modes of several orders q can be used, there are in fact several useable resonances within each FSR.

Figure 5:
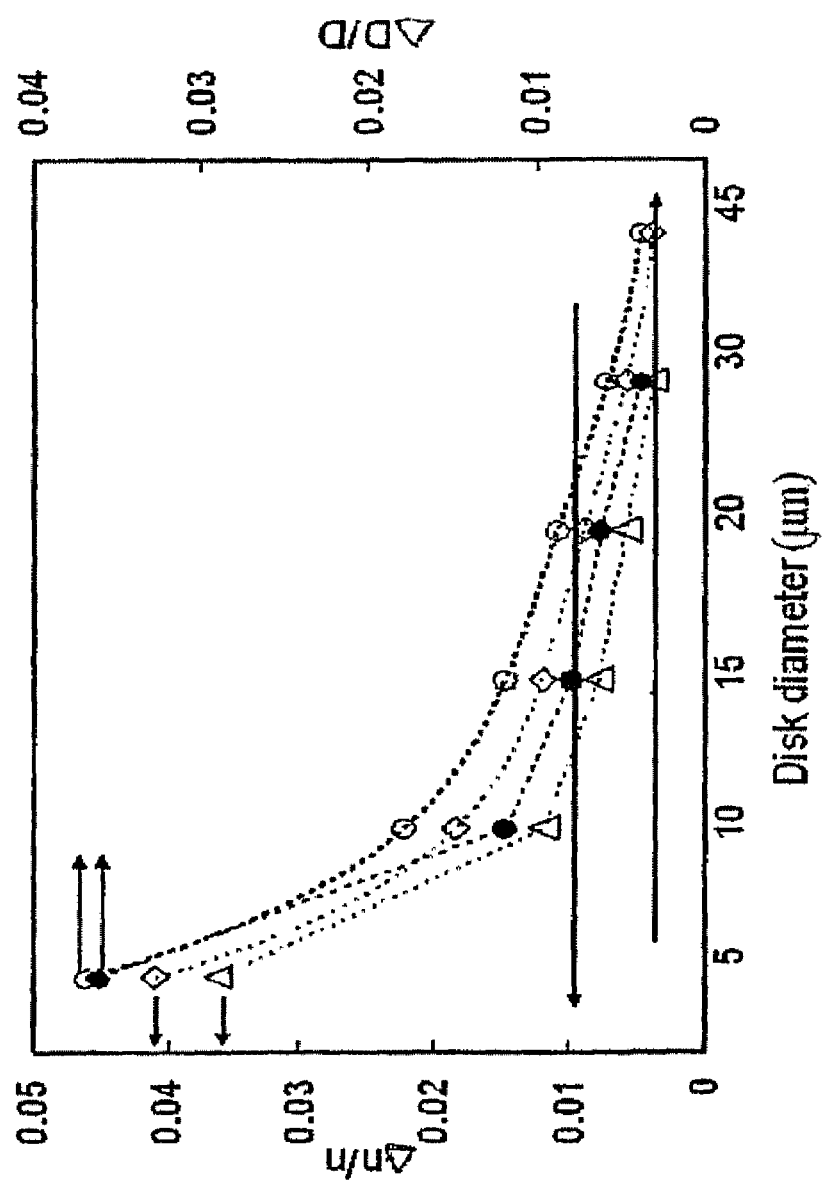
FIG. 5 shows plots of the relative changes in index of refraction and in D that provide a full spectral range scan, vs. D, for two indices of refraction.

FIG. 5 shows the calculated $\Delta n/n$ and $\Delta D/D$ needed to scan one full FSR, vs. D, at a wavelength of 780 nm. The curve marked with triangles is $\Delta n/n$ for an index of refraction of 2.17. The curve marked with diamonds is $\Delta n/n$ for an index of refraction of 1.454. The curve marked with solid circles is $\Delta D/D$ for an index of refraction of 2.17. The curve marked with open circles is $\Delta D/D$ for an index of refraction of 1.454. The two long arrows correspond to actual materials. The long arrow pointing to the left shows experimentally obtained $\Delta n/n$ for InP. The long arrow pointing to the right shows experimentally obtained $\Delta D/D$ for $BaTiO_3$.

In the case of optoelectrical tuning, the tuning is achieved by applying to the microdisk a uniform electric field that tunes the optical refractive index of the microdisk, thereby changing the resonance wavelength. As shown in FIG. 1, the bottom of microdisk 12 is covered by an electrically conductive layer 30 and the top of microdisk 12 is covered by an electrically conductive layer 32. A voltage is applied across layers 30 and 32 to create the necessary electric field. For example, crystalline materials usually have a relative index of refraction change of 0.01% to 1% for a field of $10^5$ volts per meter. If microdisk 12 is 5 microns thick, a voltage difference of 5 volts provides such an electric field across microdisk 5. FIG. 5 shows that the needed tuning can be achieved for microdisks 12 whose diameters D are at least about 15 microns.

The piezoelectric effect also can be used to change the diameter of a microdisk. In this case, the disk must be fabricated from a transparent piezoelectric material. The voltage necessary for tuning is obtained as in the optoelectrical case using layers 30 and 32. Transparent piezoelectric materials such as $BaTiO_3$ have a piezoelectric coefficient on the order of $10^{-10}$ meters per volt, which leads to $\Delta D/D$ around 0.003 for electric fields of $3 \times 10^7$ volts (150 volts across microdisk 12 if microdisk 12 is 5 microns thick). FIG. 5 shows that in this case, D greater than or equal to about 30 microns enables a full FSR scan. For both optoelectric tuning of refractive index and piezoelectric tuning of disk diameter, using higher voltages and more exotic materials allows even smaller disk diameters.

A comparison of FIGS. 3 and 5 shows that for microdisks 12 whose diameters D are in the tunability range, from about 15 microns to about 50 microns, a quality factor of at least about $10^5$ can be attained, provided that the gap g between microdisk 12 and waveguide 14 is between about 0.3 microns and about 0.7 microns. As seen in FIG. 3, higher quality factors than this have been achieved in the prior art, but only for larger gaps g and much larger diameters D. The highest quality factors that have been achieved in the diameter and gap ranges of the present invention, like the quality factors of Hagness et al. that are shown in FIG. 4, are on the order of $10^4$.

While the invention has been described with respect to a limited number of embodiments, it will be appreciated that many variations, modifications and other applications of the invention may be made.

What is claimed is:

1. An optical device comprising:
   (a) a waveguide; and
   (b) a microdisk, optically coupled to the waveguide, separated from said waveguide by a gap of between about 0.3 microns and about 0.7 microns and having a diameter of between about 15 microns and about 50 microns and a quality factor of at least about $10^5$.

2. The optical device of claim 1, wherein said microdisk is substantially cylindrical.

3. The optical device of claim 1, wherein said microdisk is substantially toroidal.

4. The optical device of claim 1, wherein said waveguide is tapered for mode matching with said microdisk.

5. The optical device of claim 1, wherein said waveguide and said microdisk are fabricated on a common substrate.

6. The optical device of claim 1, wherein said diameter is at most about 30 microns.

7. The optical device of claim 1, wherein said diameter is at most about 20 microns.

8. The optical device of claim 1, wherein said gap is at least about 0.5 microns and said quality factor is at least about $10^6$.

9. The optical device of claim 1, wherein said gap is about 0.7 microns and said quality factor is at least about $10^7$.

10. The optical device of claim 1, further comprising:
    (c) a mechanism for tuning said microdisk.

11. The optical device of claim 1, wherein said mechanism is an optoelectric mechanism.

12. The optical device of claim 1, wherein said mechanism is a piezoelectric mechanism.

* * * * *

UNITED STATES PATENT AND TRADEMARK OFFICE
CERTIFICATE OF CORRECTION

PATENT NO. : 7,466,889 B1  
APPLICATION NO. : 11/572633  
DATED : December 16, 2008  
INVENTOR(S) : Michael Rosenblit and Ron Folman Page 1 of 1

It is certified that error appears in the above-identified patent and that said Letters Patent is hereby corrected as shown below:

Title page,

Assignee item (73) should be corrected as follows:
change
--Ben Gurion University of the Neger Research and Development Authority,
  Beer Sheva (IL)--
to
"Ben Gurion University of the Negev Research and Development Authority,
  Beer Sheva"

Claim 1 (a), column 5 should be corrected as follows:

Line 4: change
      --optically coupled to the waveguide--
      to
      "optically coupled to said waveguide"

Signed and Sealed this

Third Day of February, 2009

JOHN DOLL  
*Acting Director of the United States Patent and Trademark Office*